Patented Jan. 27, 1931

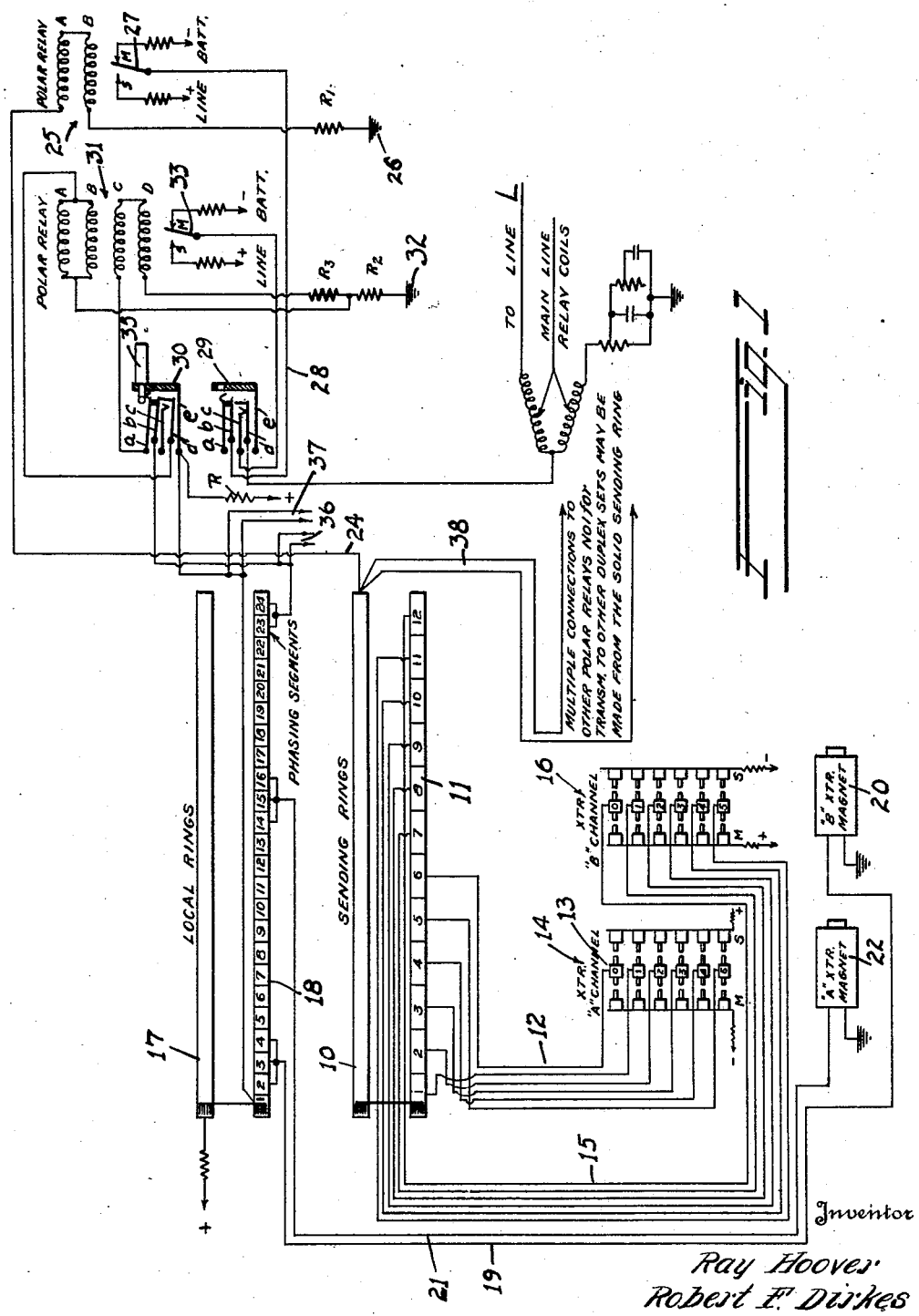

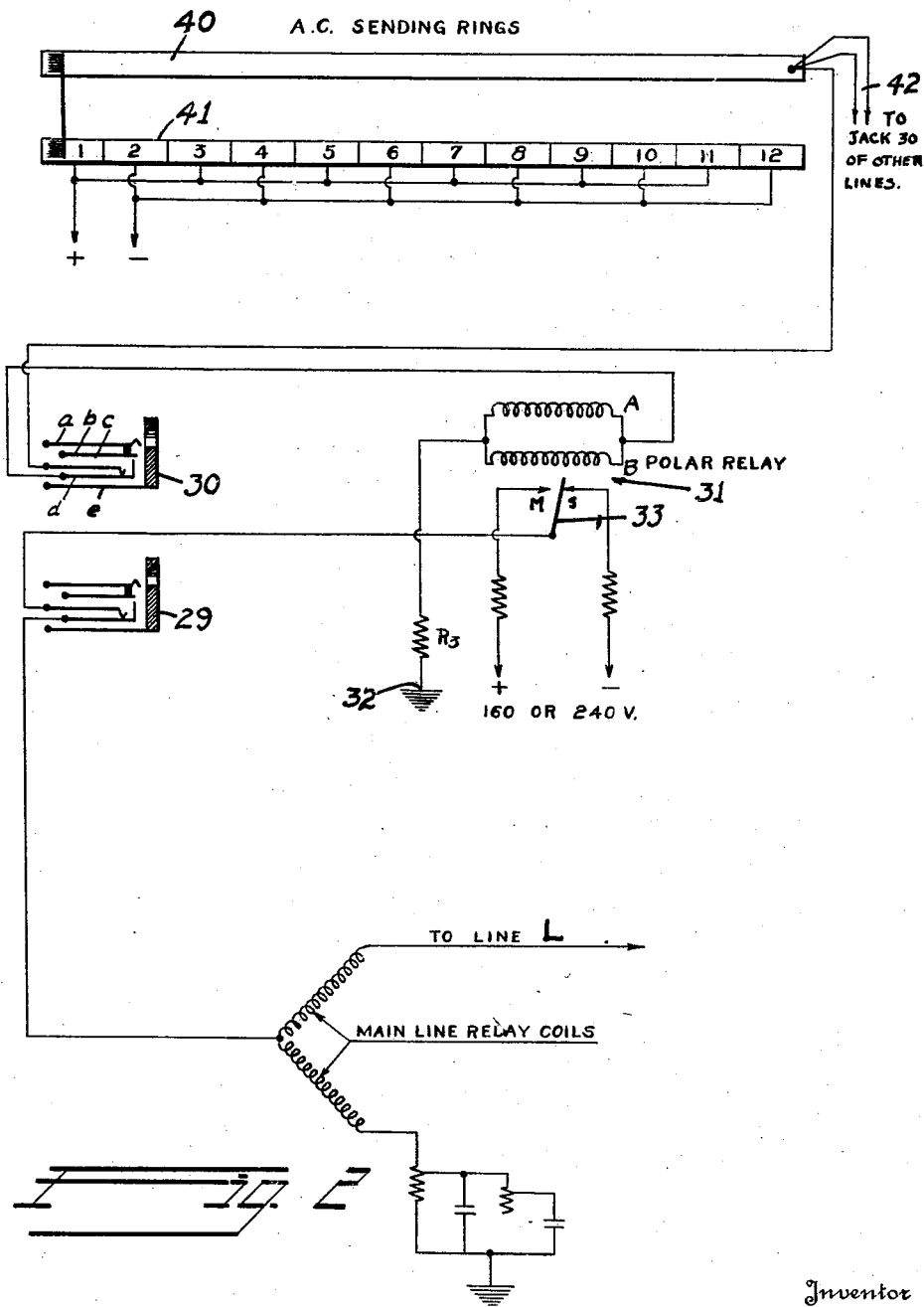

1,790,150

UNITED STATES PATENT OFFICE

RAY HOOVER, OF NORTH PLAINFIELD, NEW JERSEY, AND ROBERT F. DIRKES, OF JAMAICA, NEW YORK, ASSIGNORS TO THE WESTERN UNION TELEGRAPH COMPANY, OF NEW YORK, N. Y., A CORPORATION OF NEW YORK

MEANS OF PHASING

Application filed April 29, 1930. Serial No. 448,369.

This invention relates to a telegraph transmission system and more particularly to a multiplex telegraph system for transmitting phasing signals to telegraph lines for use in establishing the correct phase relationship between the transmitting and receiving distributors.

The present invention is particularly advantageous in multiplex telegraph transmission systems in which a single or master distributor is employed to transmit simultaneously to a plurality of outgoing lines, as for instance in the distribution of news, commodity quotations and similar information, although it is not limited thereto.

In the operation of multiplex systems, in addition to the ordinary intelligence signals, it is necessary to transmit from time to time series of phasing signals for use in establishing the proper phase relation between the receiving and transmitting distributors and also to transmit rapid current reversals or alternating current impulses for use in obtaining a balance between the artificial and real lines of a duplex system.

Heretofore it has been necessary to discontinue the operation of the tape or other transmitter while sending the phasing signals over the line. According to the usual system employed, all of the tape transmitters operating into the multiplex distributor are locked up so as to send only spacing signals, with the exception of one contact of one of the transmitters which is arranged to apply marking potential to one of the sending segments whereby a single marking impulse is transmitted to the line for each revolution of the distributor brush.

Similarly, in the transmission of the balancing or alternating current impulses to the line, it is the customary practice to disconnect the sending segments from the tape transmitter and connect them to a balancing or alternating current block which applies potential of positive polarity to each alternate sending segment and potential of negative polarity to the remaining sending segments so that positive and negative impulses are transmitted alternately to the line as the distributor brush passes over the sending segments.

It will be appreciated from the foregoing that where a single transmitting distributor is employed to send to a large number of outgoing lines that the transmission to all lines must be discontinued and the lines rendered idle whenever it is necessary to send either phasing signals or balancing signals to any one of the lines.

In a copending application, Serial No. 446,630, filed April 23, 1930, and entitled "Means for sending alternating current to multiplex lines", we have shown an arrangement permitting the transmission of balancing signals or current reversals to any one or more of a number of lines associated with a single distributor without interrupting the transmission of intelligence signals to the remaining lines.

The present invention has for one of its objects to produce a multiplex telegraph system utilizing a single or master distributor for transmitting simultaneously to two or more lines in which phasing signals may be transmitted to any one or more of the lines without interrupting the transmission of intelligence signals to the remaining lines.

Another object is to provide a distributor having facilities for simultaneously transmitting intelligence signals to one or more lines and for transmitting phasing signals to other lines.

A still further object is to provide a distributor having facilities independent of the intelligence signals sending rings for transmitting phasing signals to the lines associated therewith.

Other objects and advantages will hereinafter appear.

The invention will be described with particular reference to the accompanying drawings in which Figure 1 is a diagrammatic view of a transmitting apparatus embodying our invention, and Figure 2 is a diagrammatic view of a portion of the apparatus employed for transmitting current reversals showing the relation thereof to the apparatus employed in the embodiment shown in Figure 1.

The transmitting distributor shown in Figure 1 comprises a pair of sending rings and a pair of local rings, the distributor being arranged for two channel multiplex operation. The sending rings comprise a solid ring 10 and a segmented ring 11, the latter having segments numbered 1 to 12. The segments 1 to 6 are connected by a group of conductors 12 to the contact tongues 13 of a tape transmitter 14 operating into channel A of the multiplex system, and segments 7 to 12 are similarly connected by a group of conductors 15 to the contacts of a tape transmitter 16 operating in the channel B of the multiplex system. The tape transmitters serve to set up on the sending segments combinations of positive and negative battery in accordance with a permutation code for transmission to the outgoing line. The tape transmitters may be of the type shown in Patent No. 1,298,440 to G. R. Benjamin, granted March 5, 1919.

The local rings comprise a solid ring 17 connected to a source of positive polarity, and a segmented ring 18 having segments 1 to 24. Segments 2, 3 and 4 of ring 18 are connected by a conductor 19 to the operating magnet 20 of the B channel tape transmitter 16 and the local segments 14, 15 and 16 are connected by conductor 21 to the operating magnet 22 of the A channel transmitter. The relation of these segments to the segments of the sending ring is such that the operating magnet of one transmitter is operated to set up a new code combination while the code combination previously set up by the other transmitter is being transmitted to the line.

In accordance with our invention we utilize certain of the remaining segments of the local ring for producing phasing signals for transmission to the line and arrange the transmitting relays so that phasing signals may be transmitted to any one or more of a number of lines associated with the distributor without interfering with the transmission of intelligence signals to the remaining lines.

The solid sending ring 10 is joined by a conductor 24 to the series windings A and B of a polarized transmitting relay 25, the opposite terminal of the windings being connected to the ground at 26 through resistance $R_1$. The marking and spacing contacts of relay 25 are connected to negative and positive battery respectively and the tongue 27 is joined by a conductor 28 to contact spring $b$ of a pin jack 29. The duplex line L has its apex connected to a spring $d$ of jack 29 so that when spring $b$ is depressed by the insertion of a solid pin in the jack, contact is made between springs $b$ and $d$ to connect the tongue 27 of relay 25 to the duplex line.

The phasing segments 23 and 24 of local ring 18 are connected to spring $b$ of a jack 30 and segment 1 of ring 18 is connected to sleeve $e$ of the jack 30. The sleeve $e$ is also connected through a resistance R to a source of positive potential, and the tip spring $a$ of the jack 30 is connected to the series windings C and D of a polarized relay 31, and thence to the ground 32, through resistances $R_3$ and $R_2$.

The marking and spacing contacts of relay 31 are connected to negative and positive battery respectively, and the relay tongue 33 is connected to spring $c$ of jack 29.

When it is desired to transmit intelligence signals directly from the sending rings 10 and 11 through the polarized relay 25 to the duplex line, a solid pin 35 is inserted in jack 29, thus breaking the contact between the springs $c$ and $d$ of jack 29 and making contact between the spring $b$ and $d$, and thereby connecting the tongue 27 of relay 25 to the duplex line.

The phasing segments 23 and 24 and segment 1 of ring 18 may be connected by groups of conductors 36 and 37 to the corresponding jack 30 of any desired number of duplex lines and the solid sending ring 10 may also be connected by a group of conductors 38 to the relays 25 of other duplex lines so as to enable the same intelligence signals to be transmitted by the single distributor to each of the duplex lines.

The rotation of the sending brush over the sending rings of the distributor causes the code combinations set up on the segments to be transmitted through the polarized relay 25 directly to the duplex line.

If it is desired to transmit phasing signals over the line, the solid pin 35 is removed from the jack 29 to establish the connections shown in Figure 1, thus disconnecting the duplex line from the tongue of the relay 25 and connecting it to the tongue of relay 31. Intelligence signals generated at the sending rings will operate the tongue of the relay 25 but will not be repeated into the duplex line. However, upon each revolution of the brush over the local rings the circuit from the phasing segments 23 and 24 is completed through springs $b$ and $d$ of jack 30 to the windings A and B of the polarized relay 31 and to ground, thus moving the tongue of the relay 31 to its marking contact and transmitting a marking signal to the duplex line. As the brush leaves the phasing segments it engages segment 1 of the local ring 18 thus completing a circuit through the sleeve and tip springs of jack 30 to the series windings C and D of relay 31, in such direction as to return the tongue 33 to its spacing contact.

The tongue is held on its spacing contact during a passage of the local brush over the remaining local segments by the holding battery supplied through resistance R. The resistance R is of such value as to reduce the holding current so that it is readily overcome by the marking current applied through the phasing segments 23 and 24 to the windings A and B.

Each revolution of the local brush thus causes a single marking signal to be transmitted to the duplex line which may be employed at the receiving station for establishing the correct phase relation of the receiving and transmitting distributors.

It will be noted that the arrangement is such that any one of the duplex lines may be disconnected from the tongue of the relay 25 and connected to the tongue of the relay 31, so as to transmit phasing signals to some of the duplex lines without interfering in any way with the transmission of intelligence signals over the remaining lines.

It will be understood that in order to perform these functions, the jack 30 may be dispensed with and the connections from the phasing segments made directly to the windings of the relay 31, and in place of the jack 29, a simple switch may be employed. However, the jacks perform the additional function of permitting balancing signals or current alternations to be transmitted as described in the above mentioned copending application, so that by proper manipulation of the solid pin 35 it is possible to simultaneously transmit intelligence signals over certain lines, balancing signals over other lines, and phasing signals over still other lines.

The arrangement for permitting the transmission of the balancing signals selectively with the phasing signals is shown in Figure 2. For this purpose an extra set of rings is provided for the distributor for generating the current alternations. These A C sending rings comprise a solid ring 40 and a segmented ring 41, the latter having segments corresponding in number to the segments of the sending ring 11. The solid ring 40 is joined to the spring $c$ of jack 30 and through spring $d$ to the windings A and B of relay 31. The even numbered segments of ring 41 are strapped together and connected to a source of negative potential, and the odd numbered segments are similarly strapped together and connected to a source of positive potential.

With the solid pin 35 removed from jack 30 as shown in Figure 2, the alternate positive and negative impulses are impressed on the windings A and B as the brush of the A C sending rings passes over the segments thereof, to cause the tongue 33 of the relay to oscillate between its marking and spacing contacts and transmit current reversals to the duplex line through the contacts of jack 29. It will be appreciated that the ring 40 is connected to the jack 30 of each of the duplex lines, as by a group of conductors 42, so that the balancing signals may be transmitted to any one of the lines while either intelligence or phasing signals are being transmitted to the remaining lines.

It is obvious that various changes may be made in the circuit arrangement without departing from the invention and we do not desire to be restricted to the specific details shown and described, except in accordance with the appended claims.

What we claim is:

1. In a telegraph system, a rotary distributor having an intelligence signal ring and a phasing signal ring, the latter ring having means for generating a marking signal during a portion of each revolution of the distributor brush, and a spacing signal during the remainder of the revolution, a plurality of lines associated with said distributor, and means for transmitting intelligence signals to all or a part of said lines and for transmitting phasing signals to the remaining lines.

2. In a multiplex telegraph system, a rotary distributor having an intelligence signal ring and a phasing signal ring, a relay associated with the latter ring having opposed windings, means for energizing one of said windings during a portion of each revolution of the distributor brush to operate said relay to one of its positions, means for energizing the other winding during a further portion of the revolution of said brush to operate the relay to its other position, and means for holding the relay in the latter position during the remainder of the revolution of the distributor brush.

3. In a multiplex telegraph system, a rotary distributor having an intelligence signal ring and a phasing signal ring, a relay associated with the phasing signal ring, means including a segment of the phasing signal ring for operating said relay in one direction to produce a phasing signal of definite nature, means including an adjacent segment of said ring for operating said relay in the opposite direction to produce a phasing signal of a different nature, means for holding said relay in said latter position after the brush leaves said segment, an outgoing line and means for transmitting either phasing or intelligence signals to said line.

4. In a multiplex telegraph system, a rotary distributor having an intelligence signal ring and a phasing signal ring, a plurality of lines, an intelligence signal transmitting relay for each line, associated with said intelligence signal ring, to produce intelligence signals, a phasing signal transmitting relay for each line, means comprising segments of said distributor for operating said phasing signal relay to one position, means including an adjacent segment of said distributor for operating the relay to its opposite position, and biasing means for holding said relay in the latter position during the transition of said brush over the remaining segments of the phasing signal ring.

5. In a telegraph system, a rotary distributor having a phasing signal ring comprising a marking signal segment, a spacing signal segment, and a plurality of local segments, means for transmitting a marking signal during the passage of the distributor brush over the marking segment, means for transmitting a spacing signal during the passage of the brush over the spacing segment, and means independent of said distributor for continuing said spacing signal during the passage of the brush over said local segments.

6. In a telegraph system, a rotary distributor having a phasing signal ring, phasing segments and local segments on said ring, a phasing signal transmitting relay, a line, means for operating said relay to transmit a phasing signal over said line during passage of the distributor brush over the phasing signal segments, and means independent of said ring for maintaining the relay in definite position during passage of the brush over the local segments.

7. In a telegraph system, a rotary distributor having an intelligence signal ring and a phasing signal ring, phasing segments and local segments on the phasing signal ring, a phasing signal transmitting relay, means for operating said relay to produce a phasing signal during each passage of the distributor brush over the phasing segments, means independent of said ring for maintaining the relay in definite position during the passage of the brush over the local segments, a plurality of lines associated with said distributor, and means for transmitting intelligence signals to all or a part of said lines and for transmitting phasing signals through said relay to the remaining lines.

8. In a multiplex telegraph system, a rotary distributor having means for transmitting intelligence signals to a multiplicity of lines, and means for simultaneously transmitting a single phasing signal to other lines during each revolution of the distributor brush.

9. In a telegraph system, a transmitting distributor having an intelligence signal ring and a phasing signal ring, a plurality of lines associated with each of said rings and means for selectively distributing signals from either of said rings to any of said lines.

10. In a telegraph system, a transmitting distributor having an intelligence signal ring, a transmitter associated with said ring for setting up signal combinations on the segments thereof, a local ring having phasing segments for generating phasing signals once each revolution of the distributor brushes, a plurality of lines associated with said distributor and means for transmitting said intelligence signals to all or a part of said lines and for transmitting said phasing signals to the remaining lines.

In testimony whereof we affix our signatures.

RAY HOOVER.
ROBERT F. DIRKES.